United States Patent [19]

Takahashi et al.

[11] Patent Number: 4,685,004
[45] Date of Patent: Aug. 4, 1987

[54] ROTARY HEAD TYPE PCM RECORDING AND REPRODUCTION METHOD AND SYSTEM

[75] Inventors: Hiroaki Takahashi, Tokyo; Masaharu Kobayashi; Takaharu Noguchi, both of Yokohama; Toshifumi Shibuya; Takao Arai, both of Yokohama, all of Japan

[73] Assignee: Hitachi, Ltd., Tokyo, Japan

[21] Appl. No.: 712,094

[22] Filed: Mar. 15, 1985

[30] Foreign Application Priority Data

Mar. 19, 1984 [JP] Japan .................. 59-50915

[51] Int. Cl.$^4$ .......................... G11B 5/00; G11B 5/09
[52] U.S. Cl. ......................................... 360/32; 360/48
[58] Field of Search ................ 360/24, 48, 32, 47; 369/59; 371/2, 45, 39, 40

[56] References Cited

U.S. PATENT DOCUMENTS 4,224,642  9/1980  Mawatori et al. .................. 360/47
4,477,844 10/1984  Nakano et al. ..................... 360/32

Primary Examiner—Vincent P. Canney
Attorney, Agent, or Firm—Antonelli, Terry & Wands

[57] ABSTRACT

In a recording operation by a rotary head type PCM recording/reproducing apparatus including at least two magnetic heads, the odd-numbered sample data and the even-numbered sample data are discriminatively extracted and stored. The stored data corresponding to an amount of data outputted from the A/D converter within a predetermined time is selectively read out and supplied to the two heads to thereby record the data in such a manner that the odd-numbered data and the even-numbered data are recorded separately on a track basis or alternatively recorded separately on a preceding half and a succeeding half of each track. The error detecting and correcting code is prepared on the basis of the data to be recorded in each track. In reproduction of the recorded data, upon detection of a drop-out of the data from one of the two heads, the drop-out data is corrected through interpolation procedure to thereby reconstitute the original analog signal.

9 Claims, 22 Drawing Figures

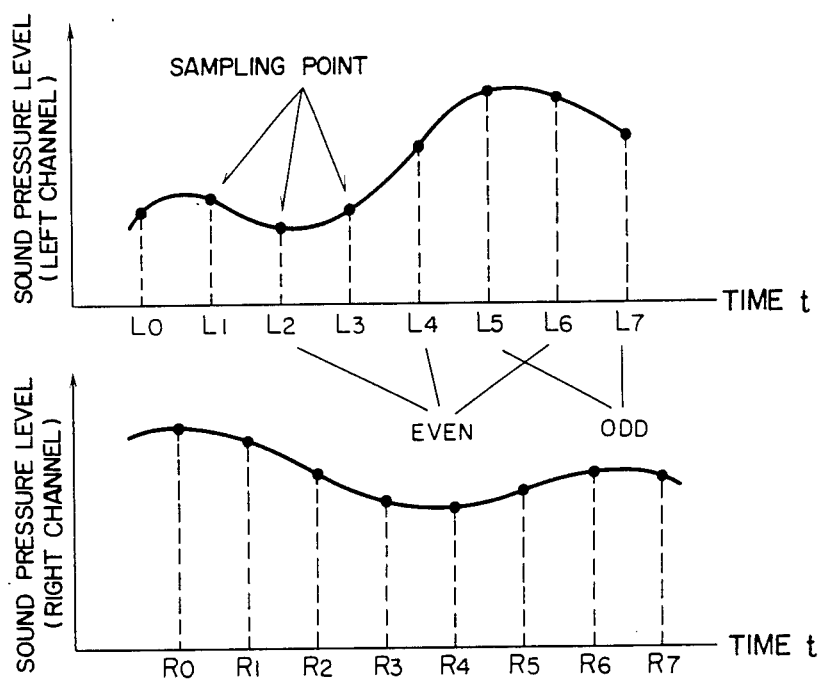

ONE-BLOCK DATA FORMAT (168 BITS)

ONE-SCAN RECORD FORMAT
(FIELD)

| FIG. 14A-1 | FIG. 14A-2 |

| 75 | 76 | 77 | 78 | 79 | 80 | 81 | | 126 | 127 |
|---|---|---|---|---|---|---|---|---|---|
| 29A' | | | | | | | | | |
| | R1u | R833u | R3u | R835u | R5u | R837u | | R51u | R883u |
| | R53u | R885u | | | | | | | |
| | R1ℓ | | | | | | | | |
| | R53ℓ | | | | | | | | |
| | R105u | R937u | R107u | R939u | R109u | R941u | | R155u | R967u |
| | R157u | R989u | | | | | | | |
| | R209u | R1041u | R211u | R1043u | R213u | R1045u | | R259u | R1091u |
| | R261u | R1093u | | | | | | | |
| Q | R313u | R1145u | R315u | R1147u | R317u | R1149u | | R363u | R1195u |
| | R365u | R1197u | | | | | | | |
| | R417u | R1249u | R419u | R1251u | R421u | R1253u | | R467u | R1299u |
| | R469u | R1301u | | | | | | | |
| | R521u | R1353u | R523u | R1355u | R525u | R1357u | | R571u | R1403u |
| | R573u | R1405u | | | | | | | |
| | R625u | P0 | R627u | | R629u | | | R675u | |
| | R677u | | | | | | | | |
| | | P1 | | P | | P | | | P |
| | R729u | P2 | R731u | | R733u | | | R779u | |
| | R781u | | | | | | | | |
| | | P3 | | | | | | | |

32 SYMBOLS

FIG. 14A-1

INTERLEAVE FORMAT
TRACK (+azimuth)

BLOCK ADDRESS →

29A'

| 0 | 1 | 2 | 3 | 4 | 5 | | 50 | 51 | 52 | |
|---|---|---|---|---|---|---|---|---|---|---|
| L 0u | L832u | L 2u | L634u | L 4u | L236u | | L 50 | L882u | | |
| L52u | L884u | L54u | L886u | L 56 u | L888u | | L102u | L934u | | |
| L0ℓ | | | | | | | | | | |
| L52ℓ | | | | | | | | | | |
| L104u | L936u | L106u | L938u | L108u | L940u | | L154u | L786u | | |
| L156u | L988u | L158u | L990u | L160u | L792u | | L206u | L1038u | | |
| L208u | L1040u | L210u | L1042u | L212u | L1044u | | L258u | L1090u | | |
| L260u | L1092u | L262u | L1094u | L264u | L1096u | | L310u | L1142u | | |
| L312u | L1144u | L314u | L1146u | L316u | L1148u | | L362u | L1194u | | |
| L364u | L1196u | L366u | L1198u | L368u | L1200u | | L414u | L1246u | | |
| L416u | L1248u | L418u | L1250u | L420u | L1252u | | L466u | L1218u | | |
| L468u | L1300u | L470u | L1302u | L472u | L1304u | | L518u | L1350u | | |
| L520u | L1352u | L522u | L1354u | L524u | L1356u | | L570u | L1402u | | |
| L572u | L1404u | L574u | L1406u | L576u | L1408u | | L622u | ////// | | |
| | | | | | | | | L1402ℓ | | |
| | | | | | | | | ////// | | |
| L624u | P0 | L626u | | L628u | | | L674u | | | |
| L676u | | L678u | | L680u | | | L726u | | | |
| | P1 | | | | | | | | | |
| | | | P | | P | | | P | P | |
| L728u | P2 | L730u | | L732u | | | L778u | | | |
| L780u | | L782u | | L784u | | | L830u | | | |
| | P3 | | | | | | | | | |

RECORDING DIRECTION ↓

Q

~

| | FIG. 14B | |
|---|---|---|
| | FIG.14B-1 | FIG.14B-2 |

29B

| 75 | 76 | 77 | 78 | 79 | 80 | 81 | ~ | 126 | 127 |
|---|---|---|---|---|---|---|---|---|---|
| | L1u<br>L53u<br>L1ℓ<br>L53ℓ | L833u<br>L885u | L3u | L835u | L5u | L837u | | L57u | L883u |
| | L105u<br>L157u | L937u<br>L989u | L107u | L939u | L109u | L941u | | L155u | L989u |
| | L209u<br>L261u | L1041u<br>L1093u | L211u | L1043u | L213u | L1045u | | L259u | L1091u |
| | L313u<br>L365u | L1145u<br>L1197u | L315u | L1147u | L317u | L1149u | | L363u | L1195u |
| | L417u<br>L469u | L1249u<br>L1301u | L419u | L1251u | L421u | L1252u | | L467u | L1279u |
| | L521u<br>L573u | L1353u<br>L1405u | L523u | L1355u | L525u | L1357u | | L571u | L1403u<br>////////<br>L1403ℓ<br>//////// |
| | L625u<br>L677u<br>L729u<br>L781u | P0<br>P1<br>P2<br>P3 | L627u<br>L731u | P | L629u<br>L733u | P | | L675u<br>L779u | P |

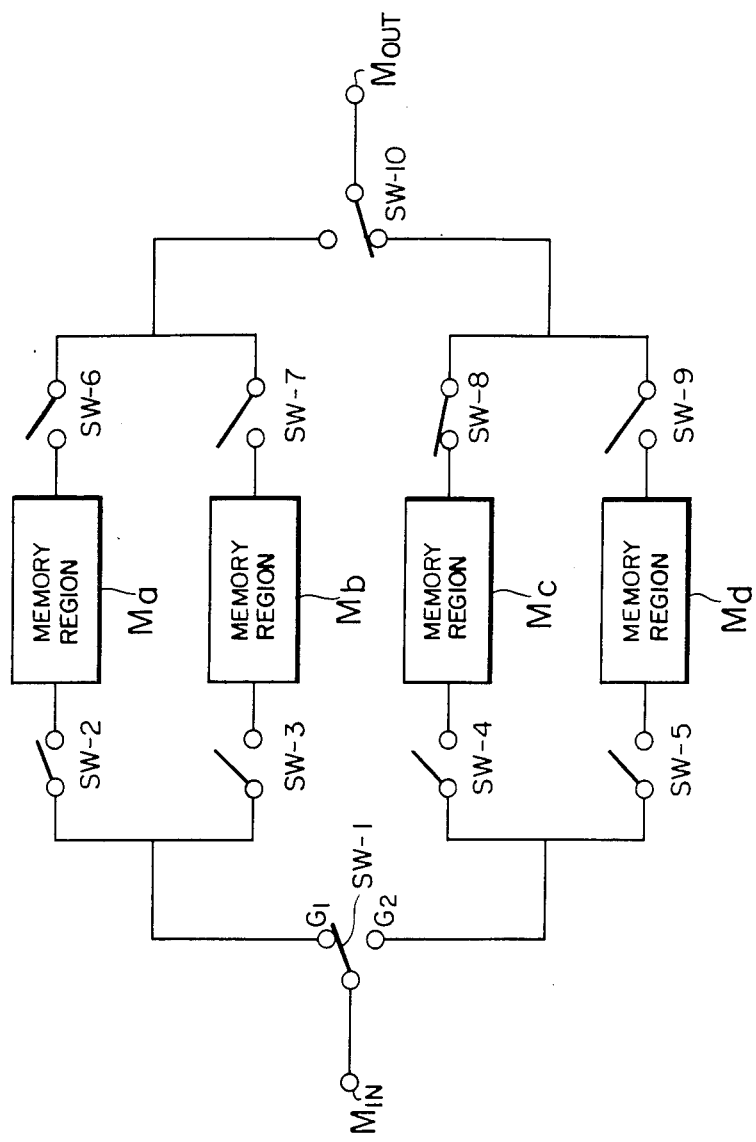

ROTARY HEAD TYPE PCM RECORDING AND REPRODUCTION METHOD AND SYSTEM

BACKGROUND OF THE INVENTION

The present invention relates to rotary head type PCM recording/reproduction. More particularly, the invention concerns a rotary head type PCM recording/reproduction method and system suited for concealment and correction of such data errors or defects as produced by drop-outs of the recording medium, such as a magnetic tape, and the jamming of the head gap.

In the rotary head type PCM recording/reproducing apparatus (hereinafter also referred to simply as "R-DAT recorder"), the amount of data which can be recorded on a recording medium per unit area (i.e. recording density) is increased by a factor of about 10 (ten) when compared with other systems such as e.g. a stationary head type multi-track PCM recorder. When viewed from the standpoint of the requisite number of heads, the R-DAT recorder for which two heads are generally sufficient is more advantageous in respect to the manufacturing cost and reliability than the stationary head type multi-track PCM recorder which usually requires 10 to 20 heads. However, in the case of the rotary-head type PCM recorder, there may arise a problem in which no reproduced data is derived through one of the heads due to a drop-out of the magnetic tape serving as the recording medium, and a jamming of the head gap is caused by deposition of dust and/or magnetic particles scaled off from the tape, resulting in the amount of data to be reproduced being then decreased to a half to degrade significantly the quality of reproduction, such as the reproduced sound. In the worst case, the reproduction itself may become impossible.

In this regard, an examination in more detail will be made concerning the principle of recording/reproduction adopted in the hitherto known rotary head type PCM recorder as well as the problems inherent in such systems, with reference to FIGS. 1 to 6 of the accompanying drawings. FIG. 1 graphically illustrates two-channel stereophonic signals and the sampling points thereof. Referring to FIG. 1, the left-channel signal (represented by L) and the right-channel signal (represented by R) are sampled alternatively on a time-sequential basis in the order of $L_0 \rightarrow R_0 \rightarrow L_1 \rightarrow R_1 \rightarrow L_2 \rightarrow R_2$ and so on. In other words, the two-channel signals are multiplexed on a time division basis so to be transmitted as a serial signal. FIG. 2 shows in a block diagram a general arrangement of a conventional rotary head type PCM recorder. In the figure, a reference numeral 1 denotes a left-channel signal input terminal, 2 denotes a right-channel signal input terminal, 3 denotes a left-channel input amplifier, 4 denotes a right-channel input amplifier, 5 denotes a multiplexer (MPX) for alternately changing over the channels to be recorded, 6 denotes an analog-to-digital (A/D) converter, 7 denotes a digital signal processing circuit for the recording signal, 8 denotes a recording output amplifier, 9 denotes a rotatable head cylinder, 10 denotes a magnetic head for a first channel (referred to also as "ch-1 head"), 11 denotes a magnetic head for a second channel (referred to also as "ch-2 head"), 12 denotes a magnetic tape, 13 denotes a reproducing preamplifier, 14 denotes a signal processing circuit for the reproduced signal, 15 denotes a digital-to-analog (D/A) converter, 16 denotes a demultiplexer (DMPX) for alternately changing over the reproduced channels, 17 denotes a left-channel output amplifier, 18 denotes a right-channel output amplifier, 19 denotes an output terminal for the left-channel signal, and numeral 20 denotes an output terminal for the right-channel signal. In the operation of this R-DAT recorder, the audio signals of the left-channel and right-channel are adjusted in level by the respective input amplifiers 3 and 4 to be subsequently subjected to channel multiplexing by the MPX 5 in the sequential order of L, R, L, R as shown in FIG. 1. The analog signal outputted from the MPX 5 is converted into a digital signal by the A/D converter 6 to be supplied to the digital signal processing circuit 7 where two basic processings are performed as mentioned below. First, the data transmitted thereto on a time serial basis is stored in a memory such as a RAM incorporated in the processing circuit, which data is then read-out from the memory in a sequence differing from the order in which the data has been written. This operation is referred to as the interleaving operation which is a sort of data dispersing processing for allowing the correct original signal to be restored even when the data as reproduced suffers from drop-outs or errors in the block. This interleaving processing is carried out by a data delay/rearraying circuit which is referred to as the interleaver. Secondly, the interleaved signal is so arrayed as to constitute error detection and correction blocks each of which has added thereto a code signal for error detection and correction such as a Reed-Solomon code. The signal processed as mentioned above is recorded on the magnetic tape 12 by the pair of rotary magnetic heads 10 and 11 after having been amplified through the recording amplifier 8. Upon reproduction, the signal picked up from the magnetic tape 12 by means of the magnetic heads 10 and 11 is amplified by the reproduction preamplifier 13 and undergoes, if necessary, correction of waveform referred to as waveform equalization, and is subsequently supplied to the digital signal processing circuit 14 of the reproduction system, where the input data is arrayed so as to constitute the data detection/correction blocks, the data suffering errors is detected and corrected (or concealed) and the sequence of the interleaved data is transformed to the original time-series sequence with the aid of a deinterleaver. This processing is referred to as the deinterleaving operation. The reproduced signal which has undergone the processings mentioned above is then converted to an analogue signal by the D/A converter 15 and subsequently is divided into the left-channel signal and right-channel signal by the demultiplexer circuit 16, resulting in the original audio signals $L_{out}$ and $R_{out}$ being produced at the respective output terminals 19 and 20. FIG. 3 shows a record pattern produced on a magnetic tape by the rotary head type PCM recorder, as viewed in the direction perpendicularly to the plane of the magnetic tape. In FIG. 3, a reference numeral 21 denotes tracks recorded by the magnetic head 10 for the first channel ch-1, and 22 denotes tracks recorded by the magnetic head 11 for the second channel ch-2. Because the heads 10 and 11 usually differ from each other is azimuth angle, it is possible to dispense with the non-recording zone (conventionally referred to as a guard band) normally required between the first channel ch-1 and the second channel ch-2. FIG. 4 shows a magnetic tape whose magnetic surface has a defect due to injury or deposition of dust particles. More specifically, a numeral 23 denotes a defect the record produced due to deposition of dust or the scaling off of magnetic particles from the tape. When the playback head passes by the defective areas where a drop-out or dust is present, the defects are reflected as errors in the reproduced signal. However, these errors are dispersed among data by virtue of the interleaving procedure described above, and can be corrected or concealed with the aid of the error correction code, so that the reproduced signal deinterleaved in succession to the error correction can be reproduced free of the influence of the drop-outs or defects. FIG. 5 of the accompanying drawings shows a typical one of the hitherto known record formats in which data is recorded in a block array through the interleaving procedure which is effective for error correction, as elucidated above. More specifically, FIG. 5 shows the record format of an amount of data which can be recorded and/or reproduced through a single scan by a single head. This capacity will be referred to as one field. As will be seen in FIG. 5, one field is composed of 256 blocks each of which is subdivided in the manner illustrated in FIG. 6. For particulars, reference may be made to Kentaro Odaka's article "A Rotary Head High Density Audio Tape Recorder" of "Technical Report Of Japan Electronic Communication Association", Vol. 1. 82, No. 190, EA 82-46 51, Nov. 30, 1982. Referring to FIG. 6, a numeral 24 designates a synchronizing signal SYNC (consisting of eight bits), 25 designates any identify code and block address code (consisting of 16 bits), 26 denotes a parity check code for data (consisting of 32 bits), 27 designates audio signal data (of 96 bits), and 28 designates a cyclic redundancy check (CRC) code (of 16 bits) for the error check operation. The parity code 26 is constituted by two parity words referred to as P parity and Q parity each of 16 bits. Further, data 27 is composed of six words $W_0$, $W_1$, $W_2$, $W_3$, $W_4$ and $W_5$ each of 16 bits. In this manner, one block is constituted by 168 bits in total, and 256 blocks in turn constitute one field. Referring again to FIG. 5, a format of interleaving will be described. It will be seen that any given block includes those words which are dispersed with a distance corresponding to 128 words. In other words, any two adjacent data words in a given block are chronographically distanced from each other for a time corresponding to 128 sampling points. By applying the interleaving procedure of this type, even such error which may take place over a succession of the blocks due to the drop-out of the tape or deposition of dust is dispersed among the blocks composed of the interleaved data words each dispersed by 128 sampling points and can be corrected by making use of the Reed-Solomon code and/or b-adjacent code as the error check code. Additionally, it will be noted that the even-numbered data such as $L_0$, $R_0$, $L_2$, $R_2$ and so forth (referred to also as even data) and the odd-numbered data such as $L_1$, $R_1$, $L_3$, $R_3$ and so forth (also referred to as odd data) are grouped in a left half and a right half, respectively, of one field, as viewed in FIG. 5. By virtue of the classification or grouping of the words in this manner, even when an error uncorrectable error takes place to such extent that a major part of the data contained in the preceding (left) half or alternatively in the succeeding (right) half of one field has been erased, the original analogue signal can be nevertheless reproduced approximately in the original form through a concealment procedure based on the previous value holding method or mean value interpolation method, so far as either the even data or odd data can be reproduced. In this connection, the length or extent of data over which the error concealment can be effected in this way is referred to as the error concealment length. In the case of the interleaving illustrated in FIG. 5, the error concealment length corresponds to 128 blocks.

As will be appreciated from the above discussion, the error correction or error concealment can be accomplished with a relatively high efficiency for the error produced due to the drop-out of the magnetic tape or deposition of dust thereon. The signal format of this type which is so arranged that the processing of all data contained in one format can be completed within a single scan period of one magnetic head will be referred to as the single-scan-completion type format or the single-field-completion type format. It should be however pointed out that the hitherto known format of the single-field-completion type suffers serious disadvantages in case the magnetic gap of one of the paired magnetic heads is jammed through deposition of dust or magnetic particles scaled off from the tape. Although error due to the jamming of the magnetic gap does not occur so frequently as burst error due to the drop-out, self-recovery from the jammed state can scarcely be expected. The jamming of the head occurring in the playback operation immediately brings about significant disturbance in the reproduced sound. Of course, the jamming occurring in the recording operation will give rise to a drop-out on the tape. With the hitherto known signal format, the signal can not completely be picked up by one magnetic head on the assumption that the head is rotated at 2000 r.p.m., with the result that the reproduced sound is intermittently intercepted at a time interval of 15 ms. Accordingly, the jamming of the head gap may provide a death-blow to the operation of PCM recording/reproducing apparatus which has been developed intrinsically with the objective of producing sound reproduction of a high fidelity. There exists thus a great demand for dealing successfully with this problem.

Concerning the present state of the R-DAT technology, reference may be made to the Japanese periodical "Electronics" of Japan Electronic Industries Association, Vol. 24, No. 10 (1984), p.p. 36–42, inter alia p.p. 40–42.

SUMMARY OF THE INVENTION

An object of the present invention is to provide a recording method for a rotary head type PCM recorder capable of realizing a data entry (format) for audio data recorded on a magnetic tape which format allows the audio data to be reproduced with an improved fidelity even when a drop-out on the tape takes place.

Another object of the present invention is to provide a reproducing method and apparatus for a rotary head type PCM recorder which makes it possible to derive a reproduced analogue signal with an adequate sound quality for practical applications even when no signal is produced by one of the magnetic heads due to the jamming of the magnetic gap thereof.

For accomplishing the objects stated above, it is proposed according to an embodiment of the invention that among the data as sampled, the odd-numbered data (or odd data) is recorded and reproduced by one head provided for one channel, while the even-number data (even data) is recorded and reproduced by the other magnetic head for the other channel or alternatively the odd data and the even data are recorded and reproduced in a preceding half and a succeeding half, respectively, of each track scan for two channels, wherein data is so formatted as to be completed in two fields (i.e. in two tracks), while the code for error detection and correction is so arrayed as to be completed on a single-field (single-track) basis.

According to an embodiment of the invention described above, data is completed through the scan by the two heads. Accordingly, even when there should arise such a situation in which no output signal is produced by one of the heads at all, it is possible to reproduce at least approximately the original analogue signal on the basis of the output signal from the other head by making use of the average value interpolation or the like method. Besides, even when an error which has occurred is concentrated to a certain region of the recording medium due to a drop-out on the tape or damage of the tape edge, it is possible to avoid degradation of the sound quality being concentrated or confined to a particular channel.

BRIEF DESCRIPTION OF THE DRAWINGS

FIG. 14A (consisting of FIGS. 14A-1 and 14A-2) and 14B (consisting of FIGS. 14B-1 and 14B-2) are views illustrating in detail the formats for recording data in two fields in accordance with the data pattern shown in FIG. 13.

FIG. 18 is a schematic diagram showing an example of a switching circuit for controlling read/write operations of the memory shown in FIG. 16.

DESCRIPTION OF THE PREFERRED EMBODIMENTS

Now, the invention will be described in detail in conjunction with the preferred embodiments thereof.

Figure 2:
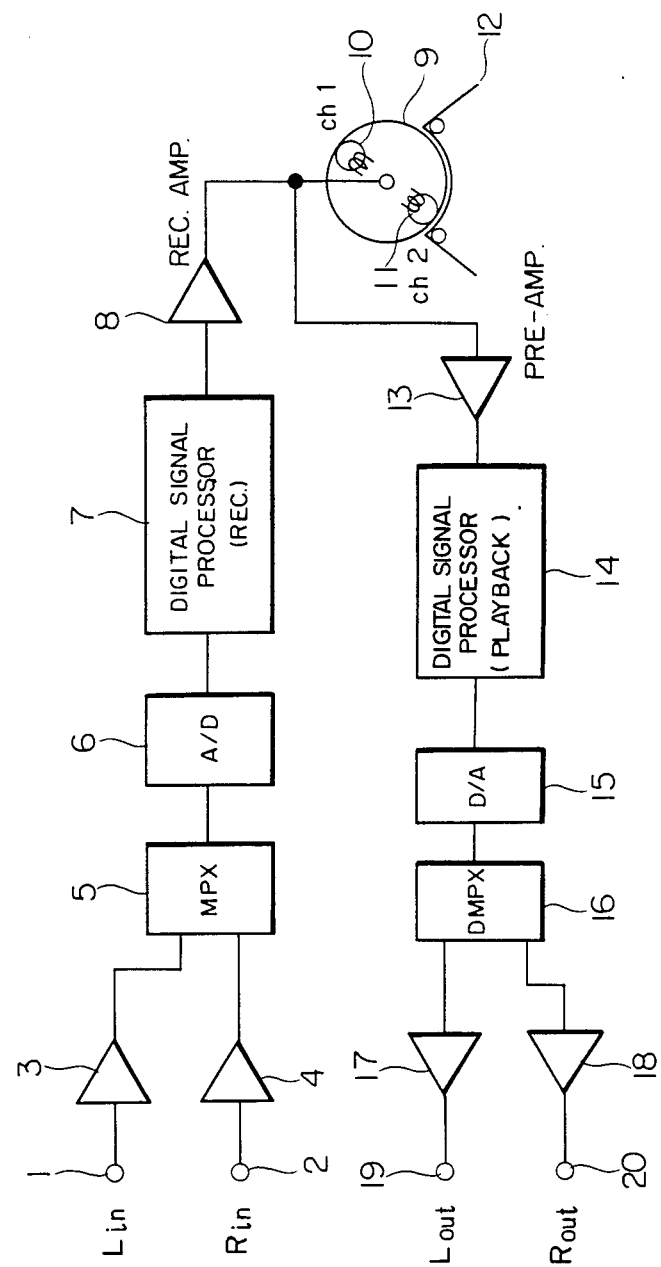
FIG. 2 is a schematic block diagram showing an arrangement of a hitherto known rotary head type PCM recorder.
Figure 3:
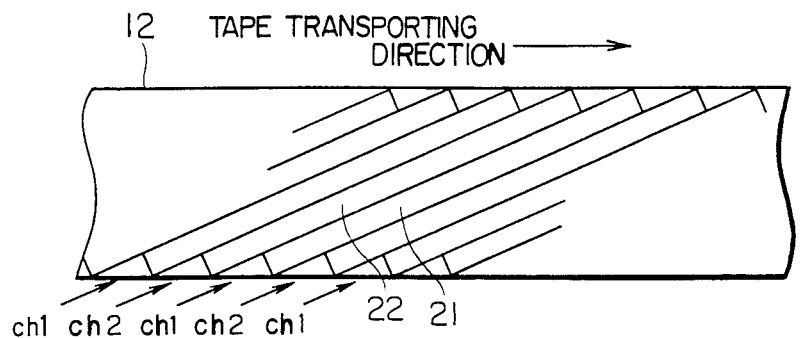
FIG. 3 is a view showing a pattern of data recorded on a magnetic tape.
Figure 4:
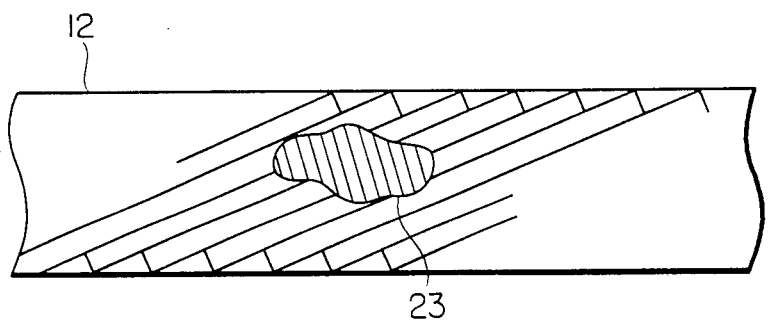
FIG. 4 is a view for illustrating, by way of example, a drop-out on a magnetic tape.
Figure 6:
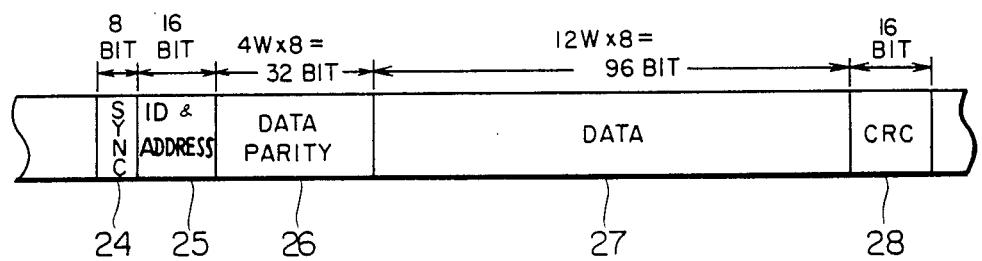
FIG. 6 is a view showing a data array in one block contained in the field.
Figure 5:
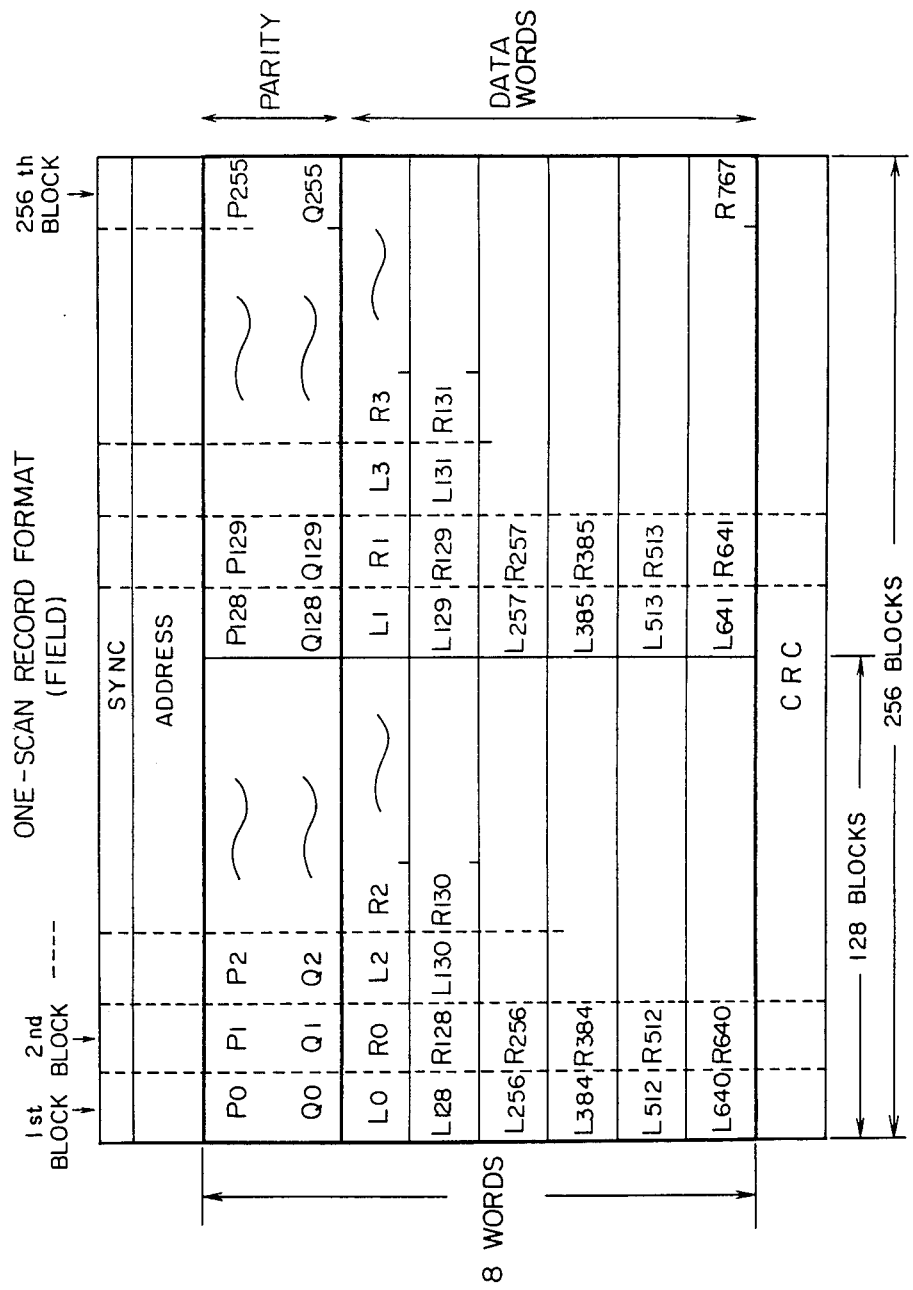
FIG. 5 is a view illustrating a data recording format constituted by one field.
Figure 7:
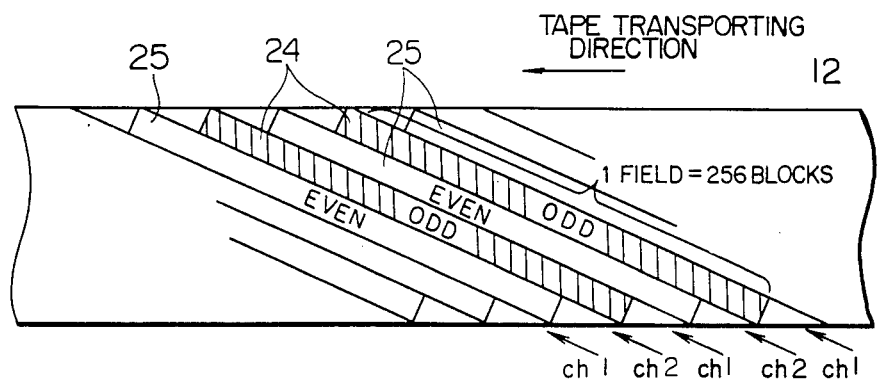
FIG. 7 is a view illustrating a data recording pattern in which the odd data and the even data are recorded on separate tracks, respectively, on a magnetic tape according to an embodiment of the present invention.

FIG. 7 is a view for illustrating a recording/reproducing method for a rotary head PCM recorder according to an exemplary embodiment of the invention. In the figure, a reference numeral 24 designates skew tracks on which only the sampled data i.e. data words (referred to as odd data) that correspond to the odd-numbered sampling points are recorded, and 25 designates skew tracks on which only the sampled data (referred to as even data) corresponding to the even-numbered sampling points are recorded. As will be seen in FIG. 7, the odd data is recorded on the tracks allocated to the magnetic head for a first channel ch-1 with the even data being recorded on the tracks allocated to the magnetic head for a second channel ch-2. By dividing or classifying the data in this manner, it becomes possible to reproduce the original analog signal without causing any appreciable discomfort to the ears of listeners, even when one of the heads does not at all produce an output signal as a result of jamming of the magnetic gap thereof. This is because either the even data signal or the odd data signal among the sampled and recorded data signals can be reproduced from the tracks provided separately for the magnetic heads, whereby the lost data, e.g. the odd data can be correctly reconstituted through average value interpolation based on the even data and vice versa. In this connection, the detection of a drop-out due to the jamming of the magnetic gap or other causes can be performed by using the error check code known per se.

Figure 8:
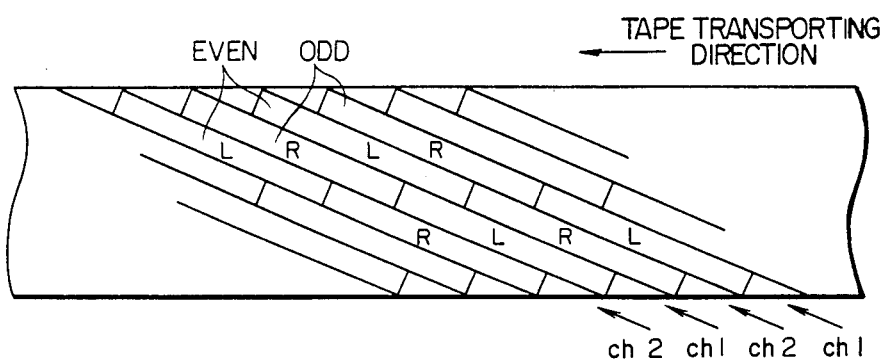
FIG. 8 is a view illustrating a data recording pattern in which left channel data and right channel data are recorded at separate areas, respectively, on a magnetic tape according to another embodiment of the invention.

In the case of the recording format shown in FIG. 8 in which the odd data and the even data are recorded separately and alternately on the tracks, it is further proposed according to the invention that the left channel data L is recorded in a preceding half of a given single scan (single field) of each head while the right channel data R is recorded in the succeeding half of the scan. On the other hand, during the next single scan, the right channel data R is recorded in the preceding half, which is followed by the succeeding half in which the left channel data L is recorded. With this structure of the format, it is possible to reconstitute the lost sampled data through the mean value interpolation procedure, even when error should be concentrated on the data recorded during the preceding half or during the succeeding half of one scan of each head due to deposition of dust on the magnetic tape surface or damage to the tape such as breakage of the tape edge or twisting of the tape.

Figure 9:
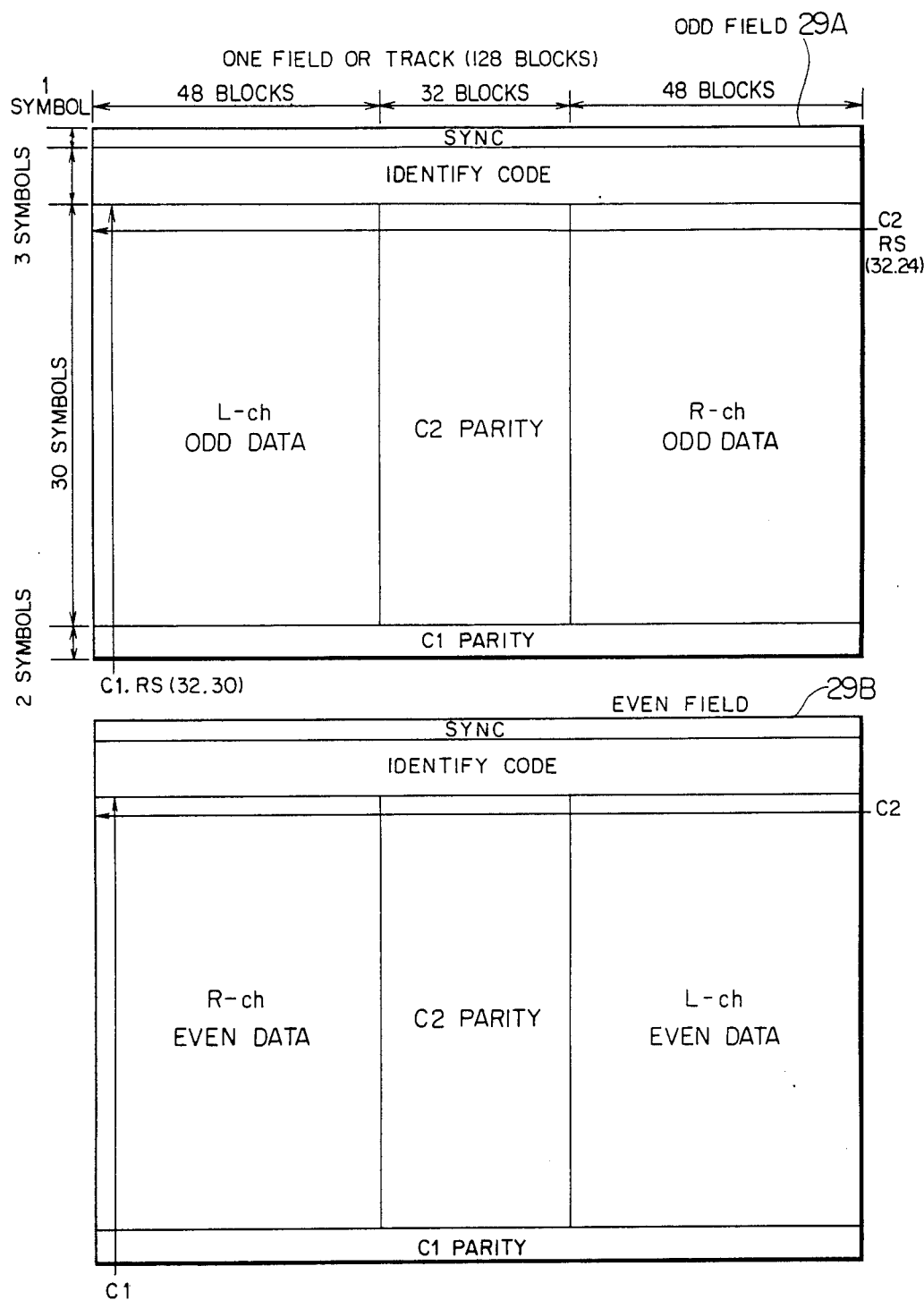
FIG. 9 is a view illustrating a format for recording data in two fields.

The recording/reproducing method described above will be elucidated more in detail in connection with the data recording format. FIG. 9 shows an example of the data recording format which can be adopted in carrying out the recording/reproducing method according to the invention. In FIG. 9, a reference letter 29A designates a single field containing only the odd data, and 29B designates another single field containing only the even data. More specifically, the data in the one field 29A is recorded on one of the tracks 24 shown in FIG. 7 while the data in the other single field 29B is recorded on one of the tracks 25. In the case of the format shown in FIG. 9, one data block is constituted by units referred to as symbols each of several bits. In consideration of the requirement imposed from the standpoint of hardware, it is common that one symbol consists of 4 to 8 bits. In the case of the illustrated embodiment, it is assumed that one symbol consists of eight bits. Accordingly, when an analog signal is sampled, for example, at 16 quantizing bits, the data of the analog signal at a given sampling point (usually referred to as one word data) can be represented by two symbols. Now referring to FIG. 9, one block is constituted by a synchronizing signal SYNC (of one symbol=1 byte), an identify code signal IDENTIFY (of three symbols) for address and control data, data signal or second decoding parity signal C2-PARITY making use of the Reed-Solomon code (of 30 symbols), and an error detection signal C1-PARITY (of 2 symbols). Thus, one block consists of 36 symbols or 288 bits in total. On the other hand, one field is composed of 128 blocks of which the first 48 blocks and the last 48 blocks (hence 96 blocks in total) are allocated for the recording of data signal, while 32 intermediate blocks are allotted for recording the parity signal C2-PARITY. In the case of the illustrated embodiment, the odd data the left channel L-ch (or right channel) is arrayed in the first 48 blocks of one field 29A, while the odd data of the right channel R-ch (or left channel) is located in the last 48 blocks. In the succeeding adjacent field 29B, the even data of the right channel R-ch (or left channel L-ch) is recorded in the first 48 blocks while the even data of left channel L-ch (or right channel R-ch) is located in the last 48 blocks. By virtue of the data array described above, it is possible to derive a reproduced signal approximating the original analog signal through the average value interpolation procedure, even when either one of the head ch-1 or ch-2 produces no output, because at least one of the even or odd data recorded on the mutually different tracks can be reproduced without fail. However, with regard to the block structure of the error detection and correction code used in connection with the recording of the data corresponding to an analog signal of a given length over or across two fields or tracks, the error detection and correction code should desirably be completed for each track, i.e. within one field. In other words, even if the data signal derived by sampling the original signal is present across two field, it is required that the error detection/correction signal (parity signal) which is created through arithmetic processing of the data signal should be completed within one field. This is because the data of one field has to be correctly reconstituted within the one field, even when either head ch-1 or ch-2 should fail to produce an output, so long as the other head produces the data signal as well as the parity signal. The data format shown in FIG. 9 is prepared to meet the above requirement, wherein the Reed-Solomon code is made use of as the error detection/correction code. To this end, the data word of 24 symbols is encoded by using (32, 34) Reed-Solomon code. Subsequently, the symbols constituting the C2-parity code block are interleaved, and the data word or C2-parity word of 30 symbols constituting one block is encoded by using (32, 20) Reed-Solomon code. Consequently, the pair of parity signals C1-PARITY and C2-PARITY are formed in the fields 29A and 29B independently, which means that the code structure is completed in each field.

Next, another embodiment of the invention will be described in which two signals sampled at mutually different sampling frequencies are recorded. In the rotary head type PCM recorder, the format has to be such that the digital dubbing of data derived through the sampling at the frequencies of 48 KHz and 32 KHz (as used in direct satellite broadcasting or DBS) and 44.1 KHz (used in the compact disk system) can be effected. The recording of data sampled at the frequencies of 48 KHz and 32 KHz is carried out by varying correspondingly the transportation speed of the tape. On the other hand, for the recording of data resulting from the sampling at the frequency of 44.1 KHz, a format for recording data sampled at 48 KHz is used in common. However, in the case of the data obtained through the sampling at the frequency of 44.1 KHz and containing a smaller number of data words than the data sampled at 48 KHz, there is formed a blank region from which no data is read out during the playback operation. In FIG. 9, the amount of data recorded in two fields is equal to 2800 words (each containing of 16 bits). Assuming that this capacity corresponds to the amount of data derived through sampling at 48 KHz, the capacity required for recording the data sampled at the frequency of 44.1 KHz is proportionately decreased to 2646 words.

Figure 10:
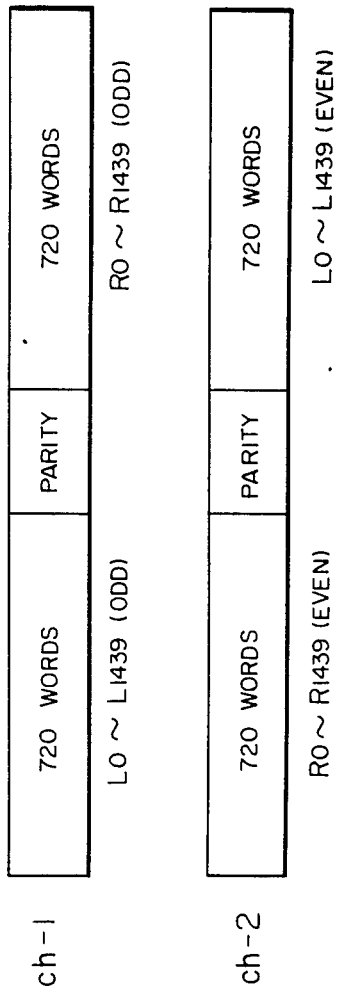
FIG. 10 is a view illustrating division of data in two fields.

FIG. 10 shows the allocation of data resulting from the sampling at 48 KHz to the field assigned to the heads ch-1 and ch-2, respectively. More specifically, 2880 words in total inclusive of 1440 words for the left and right channel data, respectively, are allocated to two fields. In the field assigned to the head ch-1, there are recorded the odd data of 720 words out of 1440 words constituting the left channel data and the odd data of 720 words out of the 1440 words constituting the right channel data, while the remaining even data of the right and left channels are recorded in the field assigned to the magnetic head ch-2.

Figure 11:
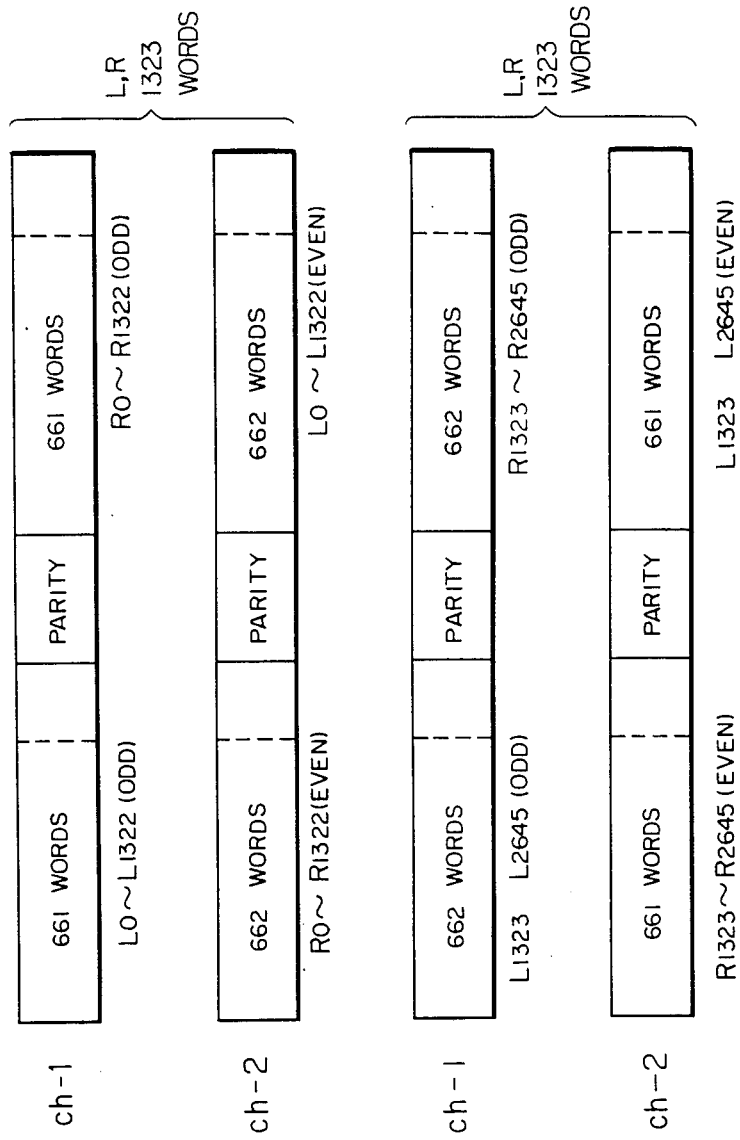
FIG. 11 is a view illustrating division of data in four fields.

On the other hand, for recording data derived through the sampling at the frequency of 44.1 KHz, there are required 2646 words in total inclusive of the 1323 words of the left channel data and 1323 words of the right channel data, wherein 661 words of the left-channel odd data and 661 words of the right-channel odd data are recorded in the field assigned to the magnetic head ch-1. There are recorded in the succeeding field assigned to the head ch-2 662 words of the left-channel even data and 662 words of the right-channel even data. Thus, data is completed in the two fields mentioned above. However, there remains an unbalance between the odd data and the even data. Accordingly, 662 words of the left-channel odd data and 662 words of the right-channel odd data are recorded in the next field assigned to the head ch-1, while 661 words of the right-channel even data and 661 words of the left-channel even data are recorded in a further succeeding field for the head ch-2. FIG. 11 shows the format thus prepared, wherein illustrating the locations at which 2646 words of data words 0 to 2645 are recorded. In the case of the instant embodiment, the field assigned to the head ch-1 is assumed to record only the odd data with the field assigned to the head ch-2 recording only the even data. It will however be understood that the change in the number of data words derived through the sampling at the frequency of 44.1 KHz can be dealt with by changing over the number of words to be processed between 661 and 662.

Figure 12:
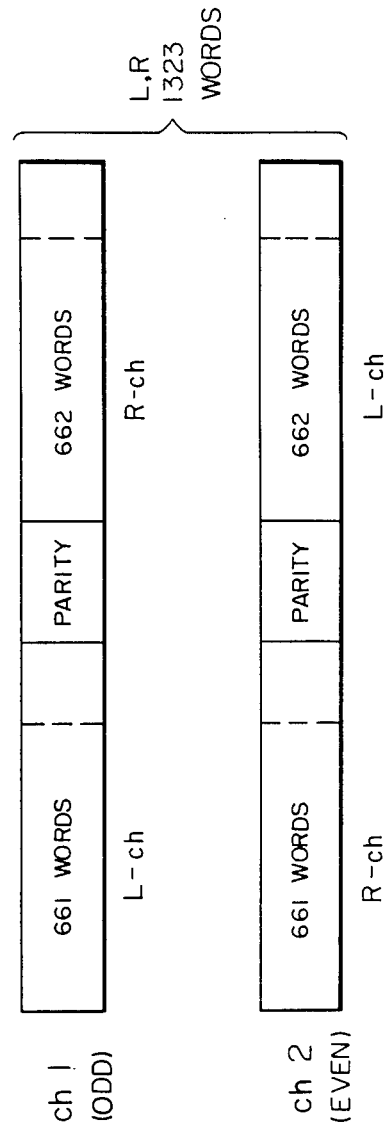
FIG. 12 is a view illustrating division of data in two fields.

FIG. 12 shows a recording format prepared for the data sampled at the frequency of 44.1 KHz according to another embodiment of the invention. In the case of this format, it is assumed that the head ch-1 is used for recording the odd data with the head ch-2 being employed for the recording the even data, wherein 661 words of the left-channel data are recorded in the field for the head ch-1 with 662 words of the same channel being recorded in the field ch-2, while 662 words of the right-channel data are recorded in the field assigned to the head ch-1 with the 661 words of the same channel being recorded in the field for the head ch-2. With the structure of the format shown in FIG. 12, 1323 words (sampled data) for the left and right channels, respectively, are obtained as the complete data through two scans by the heads ch-1 and ch-2.

It should be appreciated that the invention is never restricted exactly to the formats and the numerical values described above, but it can be implemented in other format structures in combination with other numerical values or dimensions, to similar effect.

Figure 13:
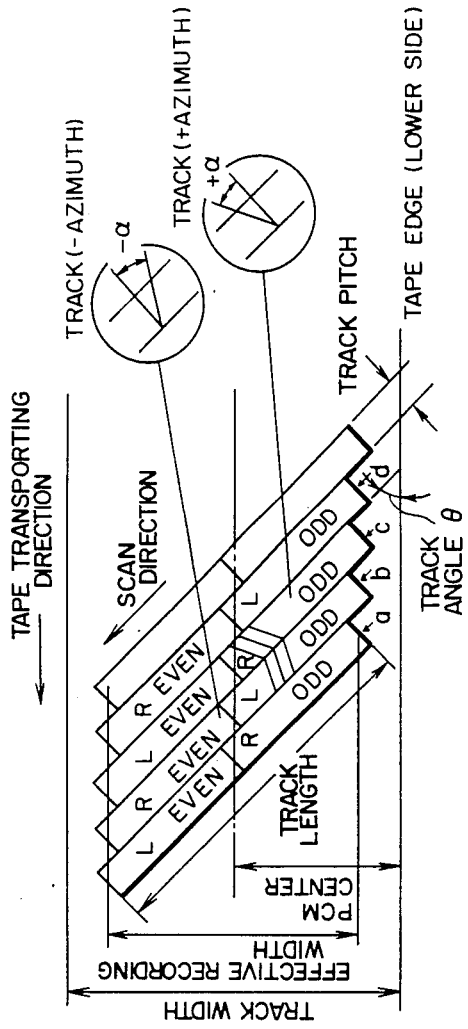
FIG. 13 is a view showing a modification of the data pattern shown in FIG. 8.

FIG. 13 shows a modification of the recording pattern shown in FIG. 8 which is rendered more immune to error due to a drop-out on the tape. More specifically, in the format shown in FIG. 8 in which the left channel data and the right channel data are alternately recorded in the preceding (earlier) and succeeding (later) halves, respectively, of the track as observed in the head scan direction of the track row, the format shown in FIG. 13 is so modified that the odd data and the even data are recorded, being allocated to the preceding and succeeding halves, respectively, of each scan of the head. Consequently, in the playback operation, the complete data can be retrieved from the paired adjacent tracks. For example, the tracks (a) and (b) are scanned to read-out sequentially the right-channel odd data, the left-channel even data, the left-channel odd data and the right-channel even data, which are subsequently stored at the memory locations described below. Then, by controlling the sequence in which this data is read-out from the memory, the audio data arrays for the left channel and the right channel are reconstituted, to thereby reproduce the original stereophonic audio signals. Since in the rotary head type PCM recorder, data is recorded with different azimuth angles on any adjacent tracks, as is well known in the art, the paired track can be easily identified. Of course, it is possible to allocate the preceding half of a single head scan to the recording of the even data with the succeeding half being allocated to the recording of the odd data.

Figures 2, 14B:
Figures 1, 14B:
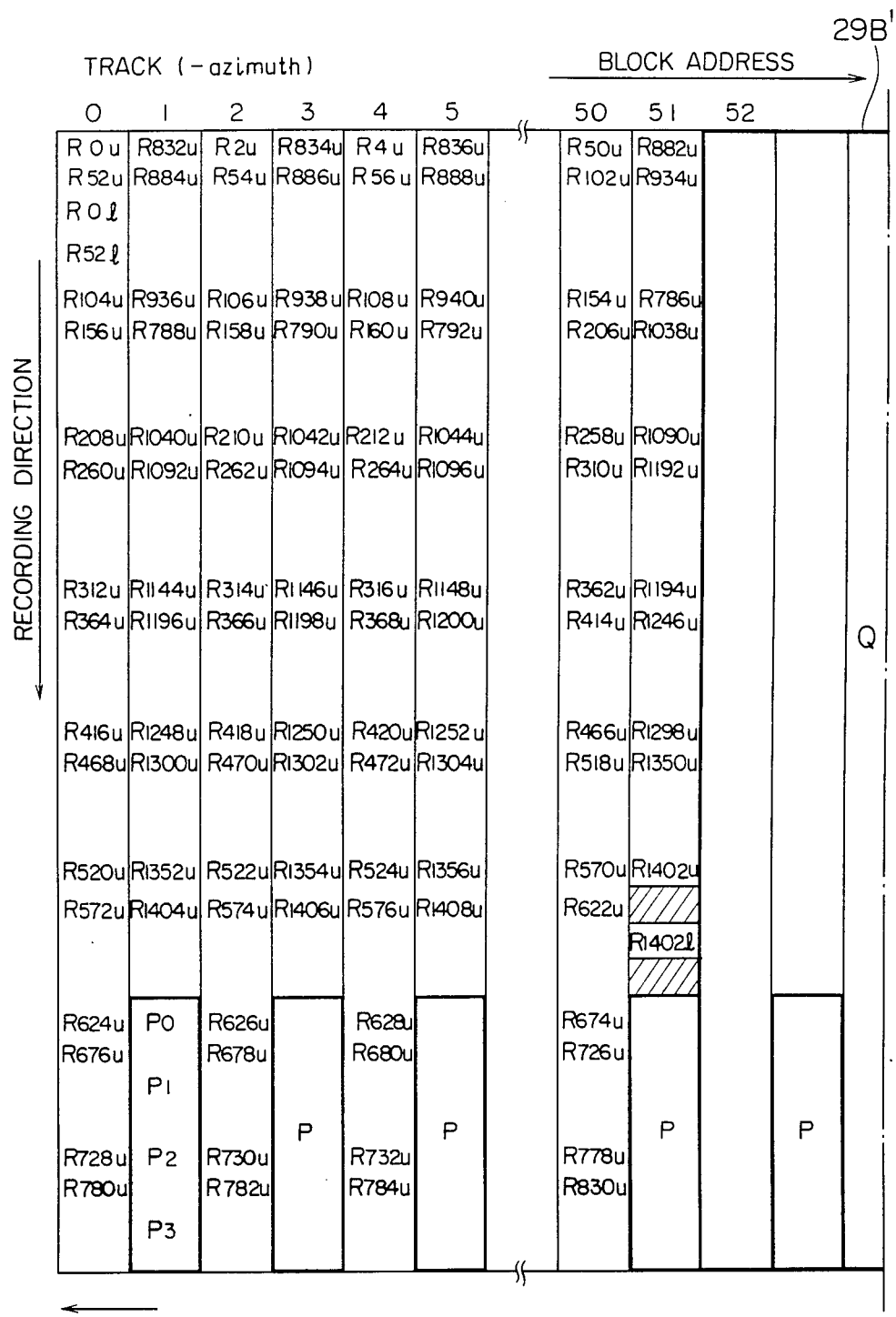
FIG. 1 is a view graphically showing sampling points on an input analog signal.

FIGS. 14A and 14B are views illustrating an example of the data recording format which can be employed in carrying out the recording/reproducing method in accordance with the modified recording pattern shown in FIG. 13. More particularly, there are shown in FIGS. 14A and 14B the contents of the paired fields 29A' and 29B' having recorded therein the odd data and the even data, respectively. The data of the first one 29A' of the paired fields are recorded on the track (a) shown in FIG. 13, while the data of the second field 29B' are recorded on the track (b). With the format illustrated in FIGS. 14A and 14B, the data blocks described hereinbefore in conjunction with FIG. 9 are formed. For the signals sampled from the right-channel and left-channel audio signals, L and R in FIGS. 14A and 14B represent the left- and right-channel signals, the affixed numerals represent the sampling sequence, and the affixed letters u and l represent the more significant and less significant bits or symbols. Letters P and Q represent the Reed-Solomon codes C1-PARITY and C2-PARITY, respectively. The sampled time-serial signals L and R are in the state of having undergone processing for forming the error detection and correction signal as well as the interleaving processing described hereinbefore in conjunction with the format shown in FIG. 9.

It should here be mentioned that the parity symbols are defined so as to satisfy the following equations:

$$H_p \cdot V_p = 0$$

$$H_Q \cdot V_Q = 0$$

where $H_Q$ and $H_P$ represent parity matrixes given by $$H_q = \begin{bmatrix} 1 & 1 & 1 & 1 & 1 & 1 & 1 & 1 \\ \alpha^{31} & \alpha^{30} & \alpha^{29} & \alpha^{28} & \alpha^{27} & \alpha^{26} & \alpha^{25} & \alpha^{24} \\ \alpha^{62} & \alpha^{60} & \alpha^{58} & \alpha^{56} & \alpha^{54} & \alpha^{52} & \alpha^{50} & \alpha^{48} \\ \alpha^{93} & \alpha^{90} & \alpha^{87} & \alpha^{84} & \alpha^{81} & \alpha^{78} & \alpha^{75} & \alpha^{72} \\ \alpha^{124} & \alpha^{120} & \alpha^{116} & \alpha^{112} & \alpha^{108} & \alpha^{104} & \alpha^{100} & \alpha^{96} \\ \alpha^{155} & \alpha^{150} & \alpha^{145} & \alpha^{140} & \alpha^{135} & \alpha^{130} & \alpha^{125} & \alpha^{120} \end{bmatrix}$$

$$\begin{matrix} 1 & 1 & 1 & 1 & 1 & 1 & 1 & 1 \\ \alpha^{23} & \alpha^{22} & \alpha^{21} & \alpha^{20} & \alpha^{19} & \alpha^{18} & \alpha^{17} & \alpha^{16} \\ \alpha^{46} & \alpha^{44} & \alpha^{42} & \alpha^{40} & \alpha^{38} & \alpha^{36} & \alpha^{34} & \alpha^{32} \\ \alpha^{69} & \alpha^{66} & \alpha^{63} & \alpha^{60} & \alpha^{57} & \alpha^{53} & \alpha^{51} & \alpha^{48} \\ \alpha^{92} & \alpha^{88} & \alpha^{84} & \alpha^{80} & \alpha^{76} & \alpha^{72} & \alpha^{68} & \alpha^{64} \\ \alpha^{115} & \alpha^{110} & \alpha^{105} & \alpha^{100} & \alpha^{95} & \alpha^{90} & \alpha^{85} & \alpha^{80} \end{matrix}$$

$$\begin{matrix} 1 & 1 & 1 & 1 & 1 & 1 & 1 & 1 \\ \alpha^{15} & \alpha^{14} & \alpha^{13} & \alpha^{12} & \alpha^{11} & \alpha^{10} & \alpha^{9} & \alpha^{8} \\ \alpha^{30} & \alpha^{28} & \alpha^{26} & \alpha^{24} & \alpha^{22} & \alpha^{20} & \alpha^{18} & \alpha^{16} \\ \alpha^{45} & \alpha^{42} & \alpha^{39} & \alpha^{36} & \alpha^{33} & \alpha^{30} & \alpha^{27} & \alpha^{24} \\ \alpha^{60} & \alpha^{56} & \alpha^{52} & \alpha^{48} & \alpha^{44} & \alpha^{40} & \alpha^{36} & \alpha^{32} \\ \alpha^{75} & \alpha^{70} & \alpha^{65} & \alpha^{60} & \alpha^{55} & \alpha^{50} & \alpha^{45} & \alpha^{40} \end{matrix}$$

$$\begin{bmatrix} 1 & 1 & 1 & 1 & 1 & 1 & 1 & 1 \\ \alpha^{7} & \alpha^{6} & \alpha^{5} & \alpha^{4} & \alpha^{3} & \alpha^{2} & \alpha & 1 \\ \alpha^{14} & \alpha^{12} & \alpha^{10} & \alpha^{8} & \alpha^{6} & \alpha^{4} & \alpha^{2} & 1 \\ \alpha^{21} & \alpha^{18} & \alpha^{15} & \alpha^{12} & \alpha^{9} & \alpha^{6} & \alpha^{3} & 1 \\ \alpha^{28} & \alpha^{24} & \alpha^{20} & \alpha^{16} & \alpha^{12} & \alpha^{8} & \alpha^{4} & 1 \\ \alpha^{35} & \alpha^{30} & \alpha^{25} & \alpha^{20} & \alpha^{15} & \alpha^{10} & \alpha^{5} & 1 \end{bmatrix}$$

$$H_p = \begin{bmatrix} 1 & 1 & 1 & 1 & 1 & 1 & 1 & 1 \\ \alpha^{31} & \alpha^{30} & \alpha^{29} & \alpha^{28} & \alpha^{27} & \alpha^{26} & \alpha^{25} & \alpha^{24} \\ \alpha^{62} & \alpha^{60} & \alpha^{58} & \alpha^{56} & \alpha^{54} & \alpha^{52} & \alpha^{50} & \alpha^{48} \\ \alpha^{93} & \alpha^{90} & \alpha^{87} & \alpha^{84} & \alpha^{81} & \alpha^{78} & \alpha^{75} & \alpha^{72} \end{bmatrix}$$

$$\begin{matrix} 1 & 1 & 1 & 1 & 1 & 1 & 1 & 1 \\ \alpha^{23} & \alpha^{22} & \alpha^{21} & \alpha^{20} & \alpha^{19} & \alpha^{18} & \alpha^{17} & \alpha^{16} \\ \alpha^{46} & \alpha^{44} & \alpha^{42} & \alpha^{40} & \alpha^{38} & \alpha^{36} & \alpha^{34} & \alpha^{32} \\ \alpha^{69} & \alpha^{66} & \alpha^{63} & \alpha^{60} & \alpha^{57} & \alpha^{54} & \alpha^{51} & \alpha^{48} \end{matrix}$$

$$\begin{matrix} 1 & 1 & 1 & 1 & 1 & 1 & 1 & 1 \\ \alpha^{15} & \alpha^{14} & \alpha^{13} & \alpha^{12} & \alpha^{11} & \alpha^{10} & \alpha^{9} & \alpha^{8} \\ \alpha^{30} & \alpha^{28} & \alpha^{26} & \alpha^{24} & \alpha^{22} & \alpha^{20} & \alpha^{18} & \alpha^{16} \\ \alpha^{45} & \alpha^{42} & \alpha^{39} & \alpha^{36} & \alpha^{33} & \alpha^{30} & \alpha^{27} & \alpha^{24} \end{matrix}$$

$$\begin{bmatrix} 1 & 1 & 1 & 1 & 1 & 1 & 1 & 1 \\ \alpha^{7} & \alpha^{6} & \alpha^{5} & \alpha^{4} & \alpha^{3} & \alpha^{2} & \alpha & 1 \\ \alpha^{14} & \alpha^{12} & \alpha^{10} & \alpha^{8} & \alpha^{6} & \alpha^{4} & \alpha^{2} & 1 \\ \alpha^{21} & \alpha^{18} & \alpha^{15} & \alpha^{12} & \alpha^{9} & \alpha^{6} & \alpha^{3} & 1 \end{bmatrix}$$

and

-continued $$V_p = \begin{bmatrix} L\ 0u \\ L\ 0l \\ L\ 104u \\ L\ 104l \\ L\ 208u \\ L\ 208l \\ L\ 312u \\ L\ 312l \\ L\ 416u \\ L\ 416l \\ L\ 520u \\ L\ 520l \\ L\ 624u \\ L\ 624l \\ L\ 728u \\ L\ 728l \\ L\ 832u \\ L\ 832l \\ L\ 936u \\ L\ 936l \\ L1040u \\ L1040l \\ L1144u \\ L1144l \\ L1248u \\ L1248l \\ L1352u \\ L1352l \\ P0 \\ P1 \\ P2 \\ P3 \end{bmatrix} \quad V_Q = \begin{bmatrix} L\ 0u \\ L\ 4u \\ L\ 8u \\ L12u \\ L16u \\ L20u \\ L27u \\ L28u \\ L32u \\ L36u \\ L40u \\ L44u \\ L48u \\ Q0 \\ Q1 \\ Q2 \\ Q3 \\ Q4 \\ Q5 \\ R\ 1u \\ R\ 5u \\ R\ 9u \\ R13u \\ R17u \\ R21u \\ R25u \\ R29u \\ R33u \\ R37u \\ R41u \\ R45u \\ R49u \end{bmatrix}$$

The calculation is defined on GF($2^8$) by the following polynomial.

$$g(X) = X^8 + X^4 + X^3 + X^2 + 1$$

and a primitive element $\alpha$ in GF($2^8$) is defined as follows.

$$\alpha = (0\ 0\ 0\ 0\ 0\ 0\ 1\ 0)$$

$$\alpha^7 \alpha^6 \alpha^5 \alpha^4 \alpha^3 \alpha^2 \alpha^1 \alpha^0$$

Figure 15:
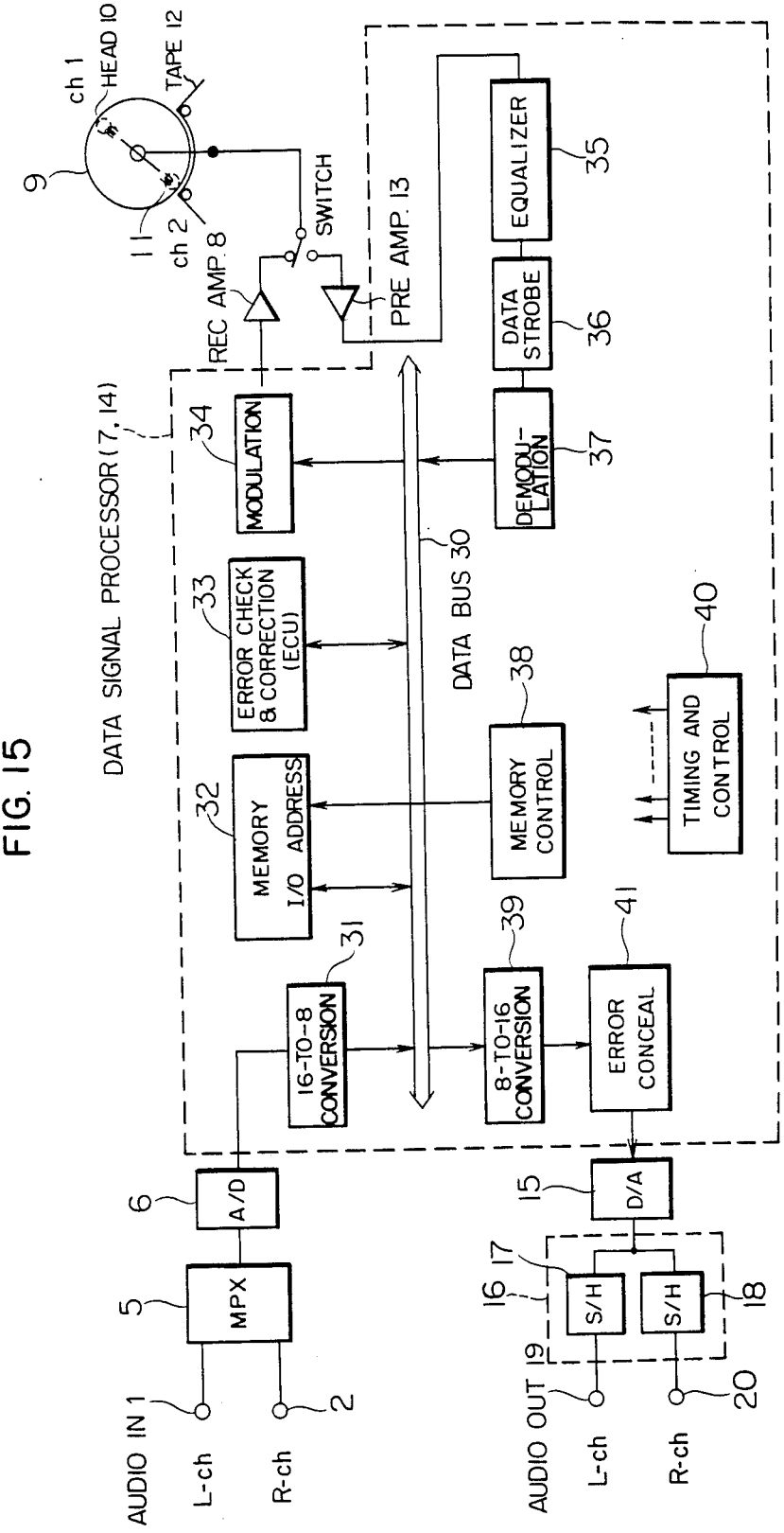
FIG. 15 shows in block diagram a general arrangement of a rotary head type PCM recording/reproducing apparatus for carrying out the recording/reproducing method according to the present invention.

FIG. 15 shows in a schmatic block diagram a general arrangement of the rotary head type PCM recording-/reproducing apparatus according to an embodiment of the invention.

At first, description will be directed to the operation in the recording mode.

A left-channel analog input signal and a right-channel analog signal applied to input terminals 1 and 2 are selected by a multiplexer or MPX 5 to be converted alternately to a digital signal of 16 bits by an analog-to-digital (D/A) converter 6. The digital signal of 16 bits is then divided into a signal of eight more significant bits (MSB) and a signal of eight less significant bits (LSB) through a 16-to-8 bit conversion circuit 31, which signals are then alternately outputted onto a 8-bit bus line 30.

The signal consisting of eight MSBs and the signal consisting of eight LSBs produced on the bus-line 30 are sequentially stored in a memory 32 at predetermined locations or regions.

The signals stored in the memory are encoded by an error correcting code encoder/decoder (ECU) 33 and subsequently read out in a predetermined sequence to be modulated by a modulating circuit 34, the output signal of which is amplified by a recording amplifier 8 and recorded on a magnetic tape 12 through magnetic heads 10 and 11.

Upon reproduction, the magnetic heads 10 and 11 are changed over to the reproducing mode from the recording mode by a changing-over switch (not shown). The reproduced signal outputted from the heads is amplified by a preamplifier 13 and subjected to predetermined waveform equalizing processing through a waveform equalizer 35. After discrimination as to the bit value "1" or "0" has been effected by a data strobe circuit 36, the signal is demodulated by a demodulator circuit 37 to be produced onto the bus line 30.

The reproduced and demodulated signals on the bus line 30 are sequentially stored in the memory 32 at predetermined locations or regions.

The signals stored in the memory are decoded by the error correcting code encoder/decoder 33 and subsequently read out in a predetermined sequence. The signals consisting of eight MSBs and eight LSBs as read out are converted into the original digital signal of 16 bits by a 8-to-16 bit conversion circuit 39. After having undergone the processing for concealing the uncorrectable erroneous data through a decoding circuit 33, the 16-bit signal is converted to an analog signal through a digital-to-analog (D/A) converter 15 so as to be divided into the right-channel signal and the left-channel signal. Alternatively, the output signal of the D/A converter may be sampled and held by sample and hold circuits 17 and 18 alternately to be supplied to audio output terminals 19 and 20 as the left-channel and right-channel signals.

Next, the interleave processing which may be adopted in the instant embodiment will be described by referring to a memory map shown in FIG. 16.

Figure 16:
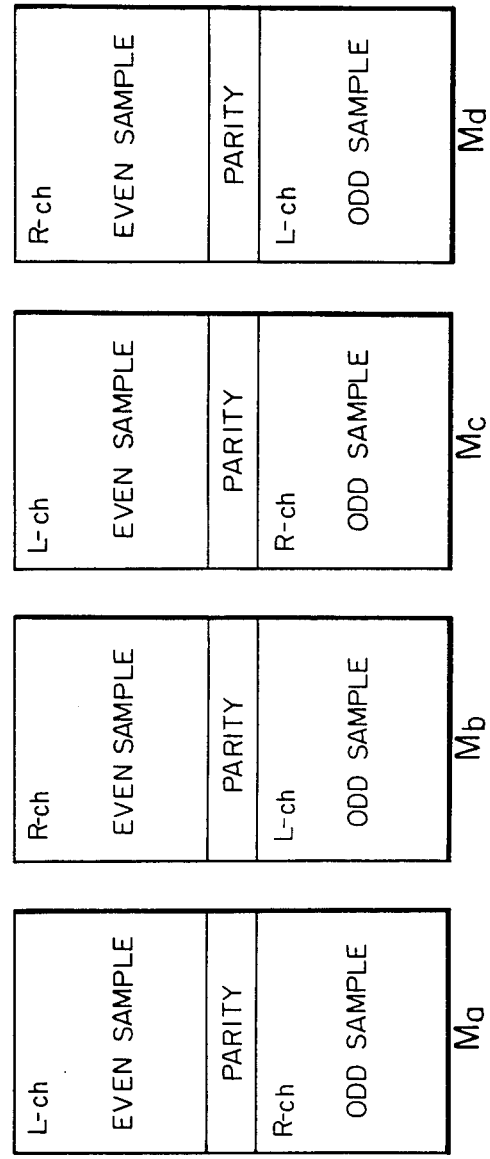
FIG. 16 is a view for illustrating a data storage structure of a memory employed in the apparatus shown in FIG. 15.

The memory 33 is constituted by four storage regions $M_a$, $M_b$, $M_c$ and $M_d$, as shown in FIG. 16. These regions are dealt with on the basis of the paired regions $M_a:M_b$ and $M_c:M_d$.

In the recording operation, the sampled signal data of left and right (L-ch, R-ch) channels are so recorded that the odd data and the even data are located at the respective allocated regions as shown in FIG. 16.

For example, the memory is divided into four regions each of which is then divided into three subregions.

At first, for fetching and outputting the data on a time-division basis, data is divided and stored in two paired regions $M_a:M_b$ and $M_c:M_d$, where the memory regions $M_a$ and $M_c$ on one hand and $M_b$ and $M_d$ on the other hand are of the identical structure. There are stored in the regions $M_a$ and $M_b$ the even data and the odd data of the left and right channels, respectively, for a predetermined period. For example, the even data of the left channel is recorded in the region $M_a$ with the odd data of the same channel being recorded in the region $M_b$, while the odd data of the right channel is stored at the region $M_a$ with the even data of the same channel being stored at the region $M_b$. Further, the even data of the left channel is stored at the preceding (upper) half area of the region $M_a$ with the odd data of the same channel being stored at the succeeding (lower) half area of the region $M_b$. The odd data of the right channel is stored at the succeeding half area of the region $M_a$ with the even data of the same channel being stored at the preceding half area of the region $M_b$. In each of the regions, the parity code is stored at the respective intermediate area.

The operation mentioned above is controlled by a memory control circuit 38 on the basis of an address signal. Namely, in dependence on the results of discrimination as to whether the data is of the right or left channel and whether the data is odd or even, the regions at which the data is to be recorded are controlled by using the address signals.

Further, the encoding operation for error detection and correction described above is executed for each of the regions $M_a$ and $M_b$. During a period in which the data stored in the regions $M_a$ and $M_b$ is encoded by the ECU 33, the encoded data stored at the regions $M_c$ and $M_b$ is recorded on the magnetic tape 12. The encoding operation and the recording operation are performed alternately.

In the reproducing operation, the reproduced signal data is fetched by the memory 32 for reproduction at the regions $M_a$, $M_b$, $M_c$ and $M_d$ in this order. The data thus fetched is decoded by the ECU 33 in the sequence in which it has been fetched. The decoded data is sequentially read out as left channel data and the right channel data from the pair of regions $M_a$ and $M_b$ and the pair of regions $M_c$ and $M_d$, respectively.

In the illustrated embodiment, the memory for the recording operation and the memory for the reproducing operation are constituted by the same memory. It is however possible to provide two memories one of which is constituted by the memory regions $M_a$ and $M_b$ with the other memory being constituted by the regions $M_c$ and $M_d$.

Figure 17A:
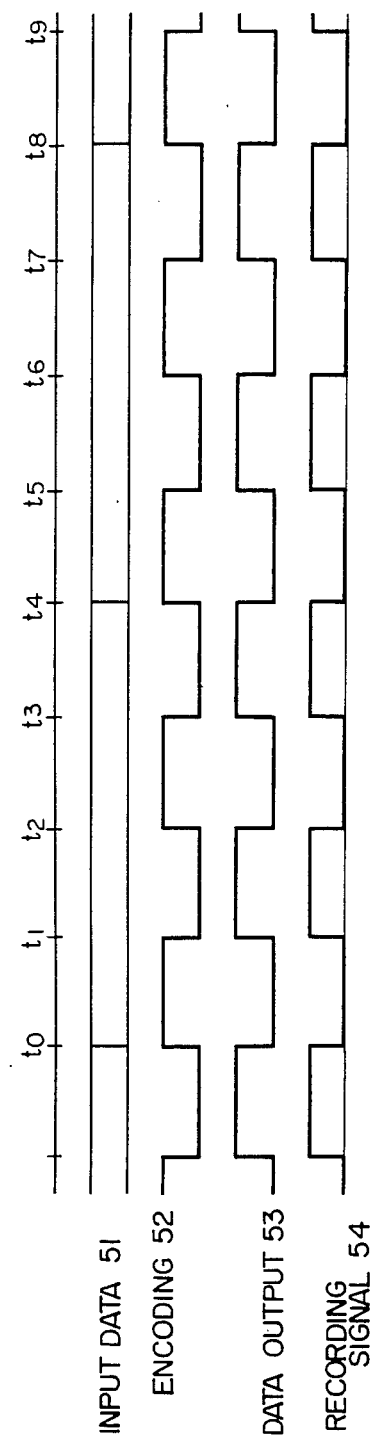
FIGS. 17A and 17B show timing signal waveform diagrams for illustrating recording and reproducing operations, respectively.

Next, the operation of the recording system will be described by referring to the timing waveform diagram shown in FIG. 17A. During a period of time points $t_0$ to $t_4$, the memory regions $M_a$ and $M_b$ are selected. By selecting the regions $M_a$ and $M_b$ alternately, the odd and even data samples of the left and right channels are fetched and loaded at predetermined regions or areas of the memory ($M_a$, $M_b$). During the encoding period from $t_4$ to $t_5$, data located in the memory region $M_a$ is encoded. During the output period from $t_5$ to $t_6$, the encoded data of the memory region $M_a$ is recorded on the magnetic tape in the predetermined format during a recording period (54). During a period from $t_7$ to $t_8$, the encoded data of the memory region $M_b$ is recorded on the magnetic tape in the predetermined format. During a period from $t_5$ to $t_8$, the memory regions $M_c$ and $M_d$ are selected. Subsequently, data is fetched, encoded and recorded on the magnetic tape in a similar manner.

Figure 17B:
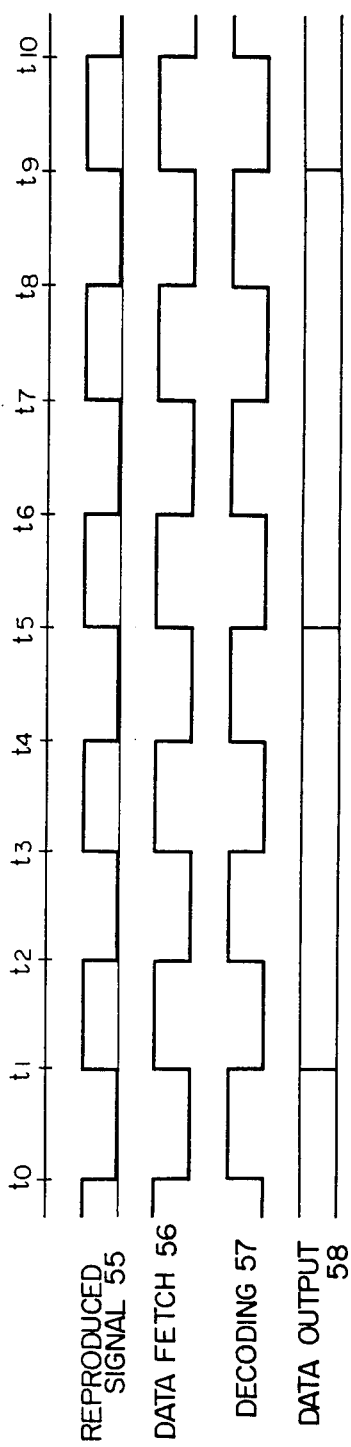

Next, the operation of the reproducing system will be described by referring to the timing diagram illustrated in FIG. 17B. During a data reproducing period (55) from $t_1$ to $t_5$, the reproduced data is loaded in the memory region $M_a$ as in the case of the data fetching period (56). During a decoding period (57) from $t_2$ to $t_3$, the data is decoded. During a data fetching period (56) from $t_3$ to $t_4$, the reproduced data is loaded in the memory region $M_b$. During the decoding period (57) from $t_4$ to $t_5$, the data is decoded. During an output period (58) from $t_5$ to $t_9$, the decoded data of the memory regions $M_a$ and $M_b$ are sequentially outputted on the time-serial basis.

Further, during the data reproducing periods (55) from $t_5$ to $t_6$ and from $t_7$ to $t_8$, the reproduced data is stored, decoded and outputted sequentially on the time-series basis.

FIG. 18 is a view showing a switch circuit for illustrating a method of controlling the read/write operations to and from the memory 32, by way of example. In operation, a switch SW-1 is closed to the memories $M_a$ and $M_b$ while a switch SW-10 is closed to the memories $M_c$ and $M_d$ during a period from $t_0$ to $t_5$. Subsequently, during a period from $t_0$ to $t_1$, switches SW-2 and SW-3 select the memories $M_a$ or $M_b$ in dependence on the result of identification of the data supplied to the memory input terminal $M_{IN}$ as to the left or right channel and odd or even data. During a period from $t_0$ to $t_1$, a switch SW-8 is closed to decode the data of the memory region $M_c$, the decoded data being outputted during a succeeding period from $t_1$ to $t_2$. Similarly during a period from $t_2$ to $t_3$, a switch SW-9 is closed to decode the data located at the memory region $M_d$, the decoded data being outputted during a succeeding period from $t_3$ to $t_4$. The data outputted through the switches SW-8 and SW-9 is transferred to the memory output terminal $M_{OUT}$ by way of the switch SW-10 closed to the memory ($M_a$, $M_b$) during a period from $t_0$ to $t_4$.

In a similar manner, data input and output are repeated alternately between the memories $M_a$:$M_b$ and $M_c$:$M_d$.

Next, the operation for reproduction will be described.

The reproduced signal is inputted to the memory input terminal $M_{IN}$, while the memory output signal is outputted from the memory output terminal $M_{OUT}$. At first, during a period from $t_1$ to $t_5$, the switch SW-1 is closed to the memories $M_a$ and $M_b$. During a period from $t_1$ to $t_2$, the switch SW-2 is closed to the memory $M_a$, whereby the reproduced signal is stored in the memory $M_a$. During a period from $t_2$ to $t_3$, the signal placed in the memory $M_a$ is decoded. During a period from $t_3$ to $t_4$, the switch SW-3 is closed to the memory $M_b$, whereby the reproduced signal is stored in the memory $M_b$. During a period from $t_4$ to $t_5$, the signal located in the memory $M_b$ is decoded. Subsequently, during a period from $t_5$ to $t_9$, the switch SW-10 is closed to the memories $M_a$ and $M_b$, while the switches SW-6 and SW-7 are alternately closed, resulting in the signals stored in the memories $M_a$ and $M_b$ being outputted sequentially on a time-series basis.

Thereafter, the data reading/writing operation is repeated alternately between the memories $M_a$:$M_b$ and the memories $M_c$:$M_d$ in a similar manner.

In the foregoing, the operation of the memories has been described on the assumption that the switches SW-1 to SW-10 are used. It will however be readily understood by those skilled in the art that the processing based on a similar operation can be performed by using a single or plural memories under the address control on a time-division basis.

We claim:

1. A signal recording/reproducing method in a rotary head type PCM recording/reproducing apparatus which comprises a plurality of recording and reproducing heads, a rotatable cylinder having said heads mounted thereon, an analog-to-digital (A/D) converter for sampling an audio signal and converting it to a digital signal, a digital-to-analog (D/A) converter for converting a digital signal to a analog signal, a recording signal processing circuit for adding an error detecting and correcting code to the digital signal, and a reproduced signal processing circuit for performing decoding and other processings of the reproduced signal, wherein the output signal from said recording signal processing circuit is recorded on a recording tape or the signal recorded on said tape is reproduced, said method comprising, in recording mode, the steps of:

(a) storing the odd-numbered sample data and the even-numbered sample data discriminatively from the sampled digital signal outputted from said A/D converter;

(b) reading selectively units of said stored data each corresponding to a completed data set of a predetermined time duration outputted from said A/D converter, said data units being supplied to said plural heads to be recorded on said tape in such a manner that the odd-numbered data and the even-numbered data are recorded alternately on a plurality of tracks of said tape or alternatively recorded on a preceding half and a succeeding half, respectively, of each of said tracks;

(c) creating an error detecting and correcting code for the data to be recorded on the track allotted thereto on the basis of the stored data to be arrayed on said allotted track before the recording of said read data on the tape, and recording said error detecting and correcting code on the tape together with the associated stored data; and comprising, in reproducing mode, the steps of:

(d) storing the data signals reproduced from said recording tape through said plural heads as the odd-numbered data and the even-numbered data;

(e) reading selectively said reproduced and stored data for converting to the analog signal to thereby reconstitute the original audio signal; and (f) checking the reproduced signal supplied from said plural heads as to whether any of said plural tracks drops out, and upon detection of the drop-out of the track, creating a correcting signal for the lost data to be otherwise present on said drop-out track through data interpolation based on the output data reproduced from the other tracks.

2. A signal recording/reproducing method according to claim 1, wherein said data unit is recorded on two adjacent tracks, said rotatable cylinder having two diametrically disposed magnetic heads mounted thereon.

3. A signal recording/reproducing method according to claim 1, wherein data of the left channel signal or the right channel signal of said audio signal which is a stereophonic signal is recorded during a preceding half-period of each scan of said two heads, while data of the right channel signal or the left channel signal is recorded during a succeeding half-period, the relation between said preceding half-period and said succeeding half-period being reversed for the data recording during a succeeding scan.

4. A rotary head type PCM signal recording method in which an audio signal is sampled to be converted into a digital signal, and an error detecting and correcting code and attendant signals are added to said digital signal, the resultant data being interleaved to be recorded on a recording medium through a plurality of heads, comprising the steps of:

(a) storing the odd-numbered sample data and the even-numbered sample data discriminatively from the sampled digital signal;

(b) reading selectively units of said stored data each corresponding to a completed data set of a predetermined time duration of said digital signal, said data units being supplied to said plural heads to be recorded on said tape in such a manner that the odd-numbered data and the even-numbered data are recorded alternately on a plurality of consecutive tracks of said tape;

(c) creating an error detecting and correcting code for the data to be recorded on the track allotted thereto on the basis of the stored data to be arrayed on said allotted track before the recording of said read data on the tape, and recording said error detecting and correcting code on the corresponding track of the tape together with the associated stored data.

5. In a rotary head type PCM recorder which includes a pair of magnetic heads, a rotatable cylinder having said magnetic heads mounted thereon so as to be diametrically opposed to each other, an analog-to-digital (A/D) converter for sampling an analog signal and converting it to a digital signal, and a signal processing circuit for adding to said digital signal an error detecting and correcting code and predetermined signals, wherein the output of said signal processing circuit is recorded on a magnetic recording medium and the recorded data is reproduced from said magnetic recording medium, a recording/reproducing method of recording or reproducing said data comprising recording the odd-numbered sample data through one of said two magnet heads, and recording and reproducing the even-numbered sample data through the other magnetic head, said odd-number sample data and said even-number sample data being recorded alternately on a plurality of consecutive tracks of said tape.

6. A recording/reproducing method according to claim 5, wherein the digital data outputted from said A/D converter for a predetermined period has a capacity capable of being recorded through two scans of the magnetic heads.

7. A signal recording/reproducing method according to claim 6, wherein said data error detecting and correcting code has a data capacity which can be recorded through a single scan of said magnetic heads.

8. A signal recording/reproducing method according to claim 5, wherein the left channel or right channel data is recorded during an earlier half-period of each scan of the two magnetic heads with the right channel or left channel data being recorded during a later half-period of said scan, while in a succeeding scan, the relation between said earlier half-period and said later half-period is reversed in such a manner that data of the right or left channel is recorded during the earlier half period with data of left or right channel being recorded during the later half-period.

9. A rotary head type PCM recording/reproducing apparatus which comprises a plurality of recording and reproducing heads, a rotatable cylinder having said heads mounted thereon, an analog-to-digital (A/D) converter for sampling an audio signal and converting it to a digital signal, a recording signal processing circuit for adding an error detecting and correcting code to the digital signal, a reproduced signal processing circuit for processing the waveform of the digital signal produced from said magnetic head and performing error detecting and correcting processing, a D/A converter for converting the output of said reproduced signal processing circuit to an analog signal, wherein the output signal from said recording signal processing circuit is recorded on a recording tape or the signal recorded on said tape is reproduced, comprising:

(a) a first memory for storing the odd-numbered sample data and the even-numbered sample data discriminatively from the sampled digital signal outputted from said A/D converter;

(b) data read means for reading selectively units of said stored data each corresponding to a completed data set of a predetermined time duration outputted from said A/D converter and controlling the reading operation of said first memory so that said data units are supplied to said plural heads to be recorded on said tape in such a manner that the odd-numbered data and the even-numbered data are recorded alternately on a plurality of consecutive tracks of said tape;

(c) error detecting and correcting code creating means coupled to said recording signal processing circuit for creating an error detecting and correcting code for the data to be recorded on the track allotted thereto on the basis of the stored data to be arrayed on said allotted track before the recording of said read data on the tape, and recording said error detecting and correcting code on the tape together with the associated stored data;

(d) a second memory for storing the data signals reproduced from said recording tape through said plural heads as the odd-numbered data and the even-numbered data;

(e) means for reading selectively said reproduced and stored data from said second memory for restoring the digital signal produced by said A/D converter, and supplying said digital signal to said D/A converter; and (f) drop-out compensating means provided in the reproduced signal processing circuit for checking the reproduced signal supplied from said plural heads as to whether any of said plural tracks drops out, and upon detection of the drop-out of the track, creating a correcting signal for the lost data to be otherwise present on said drop-out through data interpolation based on the output data reproduced from the other tracks, said correcting signal being supplied to said D/A converter.

* * * * *